(12) United States Patent
Kawanishi et al.

(10) Patent No.: US 8,351,047 B2
(45) Date of Patent: Jan. 8, 2013

(54) METHOD FOR EVALUATING CHARACTERISTICS OF OPTICAL MODULATOR HAVING HIGH-PRECISION MACH-ZEHNDER INTERFEROMETERS

(75) Inventors: Tetsuya Kawanishi, Tokyo (JP); Shinya Nakajima, Tokyo (JP); Satoshi Shinada, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 197 days.

(21) Appl. No.: 12/921,235

(22) PCT Filed: Mar. 7, 2008

(86) PCT No.: PCT/JP2008/000483
§ 371 (c)(1),
(2), (4) Date: Sep. 9, 2010

(87) PCT Pub. No.: WO2009/110039
PCT Pub. Date: Sep. 11, 2009

(65) Prior Publication Data
US 2011/0019199 A1      Jan. 27, 2011

(51) Int. Cl.
*G01B 9/02* (2006.01)
(52) U.S. Cl. ........................................ 356/477
(58) Field of Classification Search ............. 356/484; 359/246, 245; 398/198
See application file for complete search history.

(56) References Cited

U.S. PATENT DOCUMENTS

| | | | | |
|---|---|---|---|---|
| 5,301,058 A * | 4/1994 | Olshansky | ................... | 398/194 |
| 6,493,127 B2 * | 12/2002 | Gopalakrishnan | ............ | 359/254 |
| 6,970,655 B2 * | 11/2005 | Ono et al. | ...................... | 398/186 |
| 7,577,367 B2 * | 8/2009 | Way | .............................. | 398/183 |
| 2002/0005975 A1 * | 1/2002 | Nakamoto | ..................... | 359/254 |

FOREIGN PATENT DOCUMENTS

| | | |
|---|---|---|
| JP | 03-123828 A | 5/1991 |
| JP | 04-290940 A | 10/1992 |
| JP | 2002-244091 A | 8/2002 |
| JP | 2003-139653 A | 5/2003 |
| JP | 2004-077835 A | 3/2004 |
| JP | 2006-064868 A | 3/2006 |
| WO | WO 2005/091532 A1 | 9/2005 |

(Continued)

OTHER PUBLICATIONS

N. Courjal, J. Dudley, and H. Porte, Extinction-ratio-independent method for chirp measurements of Mach-Zehnder modulators, Optics Express, vol. 12, Issue 3, pp. 442-448 (2004).*

(Continued)

*Primary Examiner* — Gregory J Toatley
*Assistant Examiner* — Shawn Decenzo
(74) *Attorney, Agent, or Firm* — Posz Law Group, PLC

(57) ABSTRACT

Problem

An object is to provide a method for evaluating characteristics of individual Mach-Zehnder (MZ) interferometers in an optical modulator which includes a plurality of MZ interferometers, Means for Solving Problems The method comprises a step for adjusting a bias voltage of the MZ interferometer, a step for eliminating zero-order components, a step for measuring an output intensity and a step for evaluating characteristics. An optical modulator (1) includes the first MZ interferometer (2) and the second MZ interferometer (3). The first MZ interferometer (2) includes wave-branching section (5). Two arms (6,7), wave coupling section (8) and electrodes which is not shown in figures.

18 Claims, 3 Drawing Sheets

FOREIGN PATENT DOCUMENTS

WO WO 2007/088636 A1 8/2007

OTHER PUBLICATIONS

Tetsuya Kawanishi, Kenji Kogo, Satoshi Oikawa, Masayuki Izutsu, Direct measurement of chirp parameters of high-speed Mach-Zehnder-type optical modulators, Optics Communications, vol. 195, Issues 5-6, Aug. 15, 2001, pp. 399-404.*

International Search Report mailed on Apr. 1, 2008 for the corresponding International patent application No. PCT/JP2008/000483.

* cited by examiner

US 8,351,047 B2

METHOD FOR EVALUATING CHARACTERISTICS OF OPTICAL MODULATOR HAVING HIGH-PRECISION MACH-ZEHNDER INTERFEROMETERS

TECHNICAL FIELD

The present invention relates to a method for evaluating characteristics of an optical modulator which has a high-accuracy Mach-Zehnder interferometer. Specifically, the invention relates to a method for evaluating characteristics of an optical modulator which has a high accuracy Mach-Zehnder interferometer without using a zeroth-order component of an output.

BACKGROUND ART

Optical information communication systems use optical modulators. Therefore, it is useful for obtaining effective optical information communication systems to understand the characteristics of the optical modulators. Examples of the parameters for defining the characteristics of the optical modulators include insertion loss, modulation index, half-wavelength voltage (Vπ), optical hand, ON/OFF extinction ratio, polarized wave extinction ratio, and chirp parameter. Methods for evaluating the characteristics of optical modulators have been researched and some evaluating methods have been reported.

Japanese Patent No, 3538619 discloses an invention for measuring a power spectrum of an MZ optical modulator and obtaining a modulation index using the measured power spectrum.

Japanese Patent No, 3866082 discloses an invention for obtaining a half wavelength voltage and a chirp parameter of an optical modulator based on a spectrum distribution of an MZ optical modulator.

The methods for evaluating the characteristics of an optical modulator disclosed in the above two documents are excellent evaluating methods. However, it is desired to obtain a method for evaluating the characteristics of an optical modulator with more accurately.

In particular, in recent years, an optical modulator including a plurality of MZ interferometers has been developed. It is desired that characteristics of individual MZ interferometers in such an optical modulator are evaluated. On the other hand, in the conventional methods for evaluating the characteristics of an optical modulator, since there is generated a noise due to an MZ interferometer whose physicality is not evaluated, suitable evaluation cannot be made,
Patent Document 1: Japanese Patent No. 3538619
Patent Document 2: Japanese Patent No. 3866082

DISCLOSURE OF THE INVENTION

Problem to be Solved by the Invention

It is an object of the present invention to provide a method for evaluating characteristics of an optical modulator accurately.

It is another object of the present invention to provide a method for evaluating characteristics of individual MZ interferometers in an optical modulator including a plurality of MZ interferometers.

Means for Solving the Problem

The present invention is based on a finding that when the characteristics of an MZ interferometer are evaluated by using a zeroth-order component of the MZ interferometer, it is impossible to evaluate in accurate. Particularly, when an optical modulator includes a plurality of MZ interferometers, a zeroth-order component includes signals originating from MZ interferometers other than the MZ interferometer whose characteristics are evaluated. For this reason, the characteristics of the MZ interferometer cannot be accurately evaluated, in the present invention, normally the zeroth-order component for providing the highest intensity is not used for the evaluation of the characteristics. As a result, the characteristics of the MZ interferometer can be accurately evaluated.

The first aspect of the present invention relates to a method for evaluating characteristics of an optical modulator including a Mach-Zehnder interferometer (MZ interferometer). The MZ interferometer includes a branching section, two arms, a coupling section, and electrodes. The two arms are connected to the branching section. The coupling section is connected to the two arms. The electrodes make it possible to apply bias voltages to the two arms, and to apply modulation signals to the two arms.

The method according to the first aspect includes a step of adjusting bias voltage, a step of eliminating the zeroth-order component, a step of measuring output intensity, and a step of evaluating characteristics.

At the step of adjusting bias voltage, the phase difference between the bias voltages to be applied to the two arms of the MZ interferometer is adjusted to be n. At the step of eliminating the zeroth-order component, the optical modulator is adjusted so that the intensity of the zeroth-order component of the output light from the MZ interferometer becomes 0. At the step of measuring the output intensity, the intensity of the first-order component and the intensity of the second-order component included in the output light from the MZ interferometer, from which the zeroth-order component has been eliminated at the step of eliminating the zeroth-order component, are obtained. At the step of evaluating the characteristics, the characteristics of the MZ interferometer are evaluated by using the intensity of the first-order component and the intensity of the second-order component measured at the output intensity measuring step.

The method according to the first aspect is for evaluating the characteristics of the MZ interferometer without using the zeroth-order component included in the output light. For this reason, the characteristics of a certain MZ interferometer in the optical modulator including a plurality of MZ interferometers can be effectively evaluated.

In a preferable pattern of the method according to the first aspect, the above-described MZ interferometer is the first MZ interferometer. The optical modulator further includes the second MZ interferometer. The second MZ interferometer is different from the first MZ interferometer.

The present invention enables the effective evaluation of the characteristics of a certain MZ interferometer in the optical modulator including a plurality of MZ interferometers.

A preferable pattern of the method according to the first aspect is that the method evaluates the character, η, that relates to imbalance of light amplitude between the two arms.

The imbalance of light amplitude between the two arms is an important factor for the character of MZ interferometer. Thus if we obtain r or q related value then we could modify MZ interferometer suitably. This pattern may apply all of the features described above.

A preferable pattern of the method according to the first aspect is that the method evaluates a chirp parameter and a modulation index.

The chirp parameter (i) is an important factor for the character of MZ interferometer. Thus if we obtain alpha or alpha related value then we could modify MZ interferometer suitably. The modulation index is also an important factor for the character of MZ interferometer. This pattern may apply all of the features described above.

A preferable pattern of the method according to the first aspect is that the bias voltage is adjusted so that the odd-order components of the output light from the MZ interferometer become maximum and the even-order components other than the zeroth order component become minimum. Thereby, the phase difference between the bias voltages to be applied to the two arms of the MZ interferometer to be $\pi$. The bias voltage may be set so that the first-order components become maximum to simplify the adjustment. It may be possible to only controls for the second-order component to become minimum. Then the phase difference between bias voltage may be controlled without influenced by the other MZ interferometers.

That is, in a preferable pattern from the first aspect, the step of setting the phase difference between the bias voltages to be applied to the two arms of the MZ interferometer to $\pi$ includes a step of applying signals having skew to the two arms. The skew is a phase difference between RF (Radio Frequency) signals (modulation signals) to be applied to the two arms. Then skew (namely, the phase difference between the RF signals to be applied to the two arms) may be swept. While the skew is being swept, the outputs from the MZ interferometer are measured. In this state, a determination is made whether the symmetric property is maintained between the measured outputs from the MZ interferometer. When the determination is made that the symmetric property is maintained between the outputs from the MZ interferometer, a determination is made that the phase difference between the bias voltages is $\pi$. On the other hand, when the determination is made that the symmetric property is not maintained between the outputs from the MZ interferometer, the determination is made that the phase difference between the bias voltages is not $\pi$. As a result, the bias point can be confirmed as being accurately bias null.

In a preferable pattern of the invention according to the first aspect, the step of setting the phase difference between the bias voltages to be applied to the two arms of the MZ interferometer to $\pi$ includes a step of applying signals having skew to the two arms. The outputs from the MZ interferometer at the time of sweeping the skew are measured. Further, the step includes a step of determining whether a difference between the intensity of the first-order component and the intensity of the minus first-order component in the measured outputs from the MZ interferometer is within a constant range. That is, if the first-order component and the minus first-order component maintain the similar intensity even when the skew changes, the symmetric property is maintained between the first-order component and the minus first-order component. Therefore, according to this pattern, the accurate bias null can be confirmed.

In a preferable pattern of the invention according to the first aspect, the step of setting the phase difference between the bias voltages to be applied to the two arms of the MZ interferometer to $\pi$ includes a step of applying signals having skew to the two arms. The outputs from the MZ interferometer at the time of sweeping the skew are measured. Further, the step includes a step of determining whether a difference between the intensity of the second-order component and the intensity of the minus second-order component in the measured outputs from the MZ interferometer is within a predetermined range. That is, if the second-order component and the minus second-order component maintain the similar intensity even when the skew changes, the symmetric property is maintained between the second-order component and the minus second-order component. Therefore, according to this pattern, the accurate bias null can be confirmed.

A second aspect of the present invention relates to a method for evaluating the characteristics of the optical modulator including the Mach-Zehnder interferometer (MZ interferometer). The MZ interferometer includes a branching section, two arms, a coupling section, and an electrode. The two arms are connected to the branching section. The coupling section is connected to the two arms. The electrode can apply bias voltages to the two arms, and apply modulation signals to the two arms.

The method according to the second aspect includes a step of adjusting bias voltage, a step of eliminating a first-order component, a step of measuring output intensity and a step of evaluating characteristics. At the step of adjusting bias voltage, a phase difference between bias voltages to be applied to the two arms of the MZ interferometer is set to 0. At the step of eliminating the first-order component, the optical modulator is adjusted so that the intensity of the first-order component of the output light from the MZ interferometer becomes 0. At the step of measuring the output intensity, the intensity of the second-order component and the intensity of the third-order component included in the output light from the MZ interferometer, from which the first-order component has been eliminated at the first-order component eliminating step, are obtained. At the step of evaluating characteristics, the characteristics of the MZ interferometer are evaluated by using the intensity of the second-order component and the intensity of the third-order component measured at the output intensity measuring step.

The method according to the second aspect is for evaluating the characteristics of the MZ interferometer without using the zeroth-order component included in the output light. For this reason, the characteristics of a certain MZ interferometer in the optical modulator including a plurality of MZ interferometers can be effectively evaluated.

In a preferable pattern of the method according to the second aspect, the above-described MZ interferometer is a first MZ interferometer. In this case, the optical modulator further includes a second MZ interferometer. The second MZ interferometer is different from the first MZ interferometer.

According to the present invention, the characteristics of a certain MZ interferometer in the optical modulator including a plurality of MZ interferometers can be effectively evaluated.

A preferable pattern of the method according to the second aspect is that the method evaluates the character, $\eta$, that relates to imbalance of light amplitude between the two arms.

The imbalance of light amplitude between the two arms is an important factor for the character of MZ interferometer. Thus if we obtain $\eta$ or $\eta$ related value then we could modify MZ interferometer suitably. This pattern may apply all of the features described above.

A preferable pattern of the method according to the second aspect is that the method evaluates a chirp parameter and a modulation index.

The chirp parameter ($\alpha$) is an important factor for the character of MZ interferometer. Thus if we obtain alpha or alpha related value then we could modify MZ interferometer suitably. The modulation index is also an important factor for the character of MZ interferometer. This pattern may apply all of the features described above.

A preferable pattern of the method according to the second aspect is such that the bias voltage is adjusted so that the odd-order components of the output light from the MZ interferometer become minimum and the even-order components other than the zeroth-order component become maximum. Thereby, the phase difference between the bias voltages to be applied to the two arms of the MZ interferometer to be 0. The bias voltage may be set so that the second-order components become minimum to simplify the adjustment. It may be possible to only controls for the second-order component to become maximum. Then the phase difference between bias voltage may be controlled to be 0 easily.

That is, in a preferable pattern from the second aspect, the step of setting the phase difference between the bias voltages to be applied to the two arms of the MZ interferometer to 0 includes a step of applying signals having skew to the two arms. The skew is a phase difference between RF (Radio Frequency) signals (modulation signals) to be applied to the two arms. Then skew (namely, the phase difference between the RF signals to be applied to the two arms) may be swept. While the skew is being swept, the outputs from the MZ interferometer are measured. In this state, a determination is made whether the symmetric property is maintained between the measured outputs from the MZ interferometer. When the determination is made that the symmetric property is maintained between the outputs from the MZ interferometer, a determination is made that the phase difference between the bias voltages is 0. On the other hand, when the determination is made that the symmetric property is not maintained between the outputs from the MZ interferometer, the determination is made that the phase difference between the bias voltages is not 0. As a result, the bias point can be confirmed as being accurately bias full.

In a preferable pattern of the invention according to the second aspect, the step of setting the phase difference between the bias voltages to be applied to the two arms of the MZ interferometer to 0 includes a step of applying signals having skew to the two arms. The outputs from the MZ interferometer at the time of sweeping the skew are measured. Further, the step includes a step of determining whether a difference between the intensity of the second-order component and the intensity of the minus second-order component in the measured outputs from the MZ interferometer is within a constant range. That is, if the second-order component and the minus second-order component maintain the similar intensity even when the skew changes, the symmetric property is maintained between the second-order component and the minus second-order component. Therefore, according to this pattern, the accurate bias full can be confirmed.

In a preferable pattern of the invention according to the second aspect, the step of setting the phase difference between the bias voltages to be applied to the two arms of the MZ interferometer to 0 includes a step of applying signals having skew to the two arms. The outputs from the MZ interferometer at the time of sweeping the skew are measured. Further, the step includes a step of determining whether a difference between the intensity of the second-order component and the intensity of the minus second-order component in the measured outputs from the MZ interferometer is within a constant range. That is, if the second-order component and the minus second-order component maintain the similar intensity even when the skew changes, the symmetric property is maintained between the second-order component and the minus second-order component. Therefore, according to this pattern, the accurate bias full can be confirmed.

A third aspect of the present invention relates to a method for evaluating the characteristics of the optical modulator that comprises the Mach-Zehnder interferometer (MZ interferometer). The MZ interferometer includes a branching section, two arms, a coupling section, and an electrode. The two arms are connected to the branching section. The coupling section is connected to the two arms. The electrode can apply bias voltages to the two arms, and apply modulation signals to the two arms.

The method according to the third aspect includes a step of adjusting bias voltage, a step of measuring output intensity, and a step of evaluating characteristics. At the step of adjusting bias voltage, a voltage is set to be in the middle of a voltage with which a phase difference between the bias voltages to be applied to the two arms of the MZ interferometer becomes 0 and a voltage with which the phase difference becomes π. At the step of measuring output intensity, intensities of high-order components included in the output light from the MZ interferometer are obtained. At the step of evaluating characteristics, the characteristics of the MZ interferometer are evaluated by using a ratio between the high-order components measured at the output intensity measuring step. The method may comprise any features of the first aspect and the second aspect.

The fourth aspect of the present invention relates to a method for obtaining skew of the Mach-Zehnder interferometer (MZ interferometer) included in the optical modulator. The MZ interferometer includes a branching section, two arms, a coupling section and an electrode. The two arms are connected to the branching section. The coupling section is connected to the two arms. The electrode can apply bias voltages to the two arms, and can apply modulation signals to the two arms.

In this aspect, the phase difference between the bias voltages to be applied to the two arms includes one or a plurality of kinds thereof, and bias voltages are applied, and the outputs from the MZ interferometer are measured for respective phases of the bias voltages. The skew of the MZ interferometer is obtained by using output of MZ interferometer. Then it is possible to obtain the skew of MZ interferometer.

The present invention may provide a method for evaluating characteristics of an optical modulator accurately.

The present invention may provide a method for evaluating characteristics of individual MZ interferometers in an optical modulator including a plurality of MZ interferometers.

EXPLANATION OF ELEMENT NUMERALS

Figure 1:
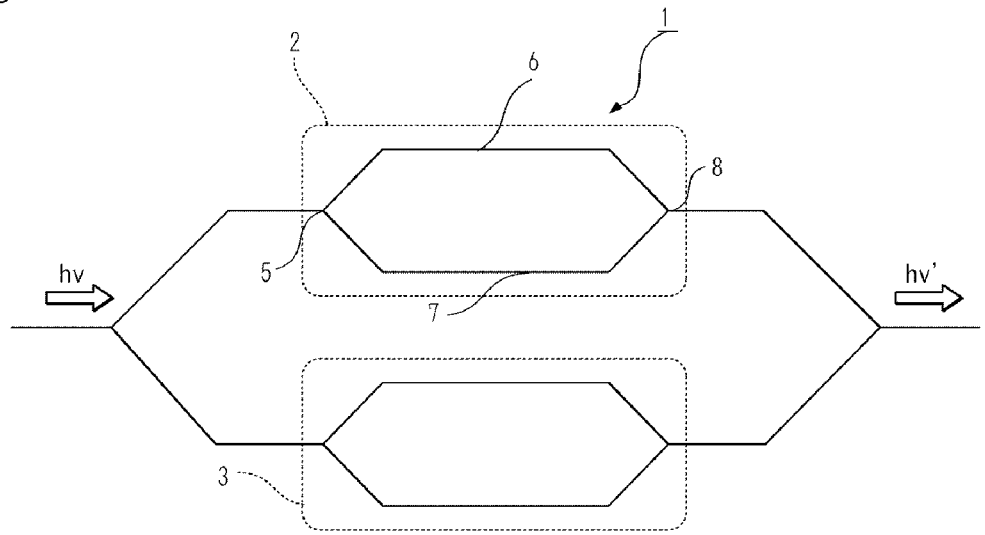
FIG. 1 is a diagram which illustrates an example of the optical modulator including a Mach-Zehnder interferometer.

1 an optical modulator
2 the first Mach-Zehnder interferometer
3 the second Mach-Zehnder interferometer
5 branching section
6 the first arm
7 the second arm
8 coupling section

BEST MODE FOR CARRYING OUT THE INVENTION

The first aspect of the present invention relates to a method for evaluating characteristics of an optical modulator including a Mach-Zehnder interferometer (MZ interferometer). The MZ interferometer includes a branching section, two arms, a coupling section, and electrodes. The two arms are connected to the branching section. The coupling section is connected to the two arms. The electrodes make it possible to apply bias voltages to the two arms, and can apply modulation signals to the two arms.

FIG. 1 is a diagram which illustrates an example of the optical modulator including a Mach-Zehnder interferometer. The optical modulator (1) includes the first Mach-Zehnder interferometer (2) and the second Mach-Zehnder interferometer (3). The first Mach-Zehnder interferometer (2) includes branching section (5), two arms (6 and 7), coupling section (8) and an electrode (not shown). The MZ interferometer and the optical modulator including the MZ interferometer are publicly known. The first arm is denoted by the reference numeral 6, and the second arm is denoted by the reference numeral 7.

Figure 2:
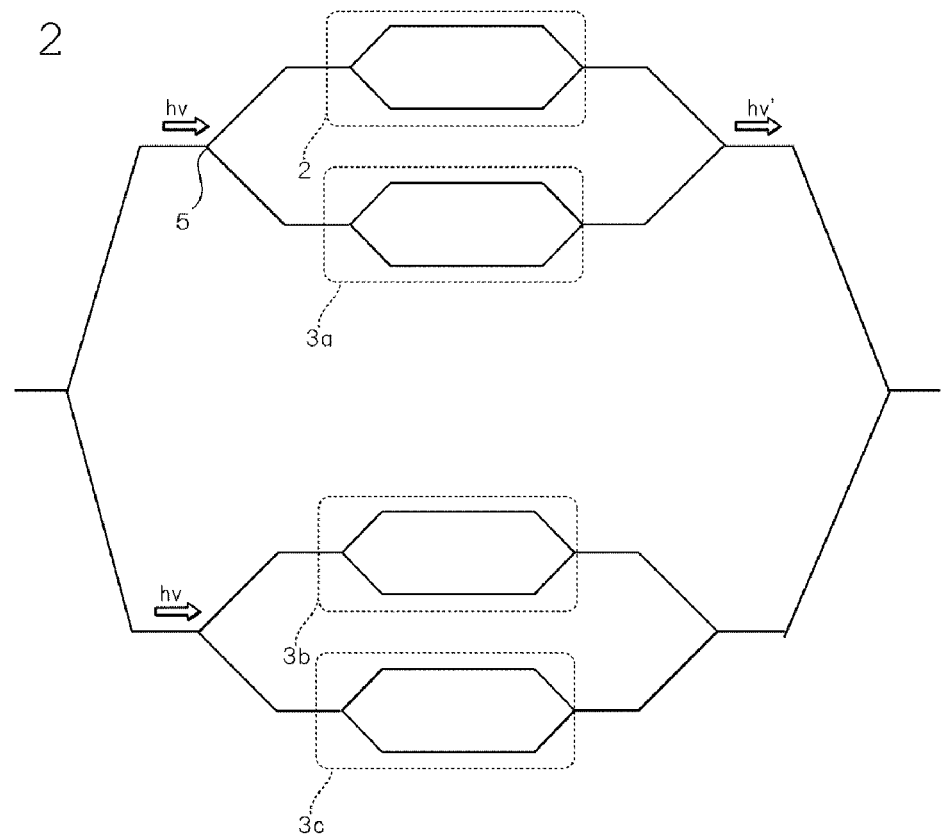
FIG. 2 is a diagram illustrating an example of an optical modulator having a plurality of Mach-Zehnder interferometers.

FIG. 2 is a diagram illustrating an example of an optical modulator having a plurality of Mach-Zehnder interferometers. This optical modulator has two main Mach-Zehnder interferometers. Each of the main Mach-Zehnder interferometers has two sub Mach-Zehnder waveguides. In this example, the Mach-Zehnder interferometer to be evaluated is denoted by the reference numeral 2. On the other hand, this optical modulator includes the Mach-Zehnder interferometers ($3a$, $3b$ and $3c$) other than the target to be evaluated. The optical modulator shown in FIG. 2 functions as a quadrature amplitude modulation (QAM) signal generating apparatus. That is, the present invention can be effectively used for evaluating characteristics of a certain Mach-Zehnder waveguide included in the quadrature amplitude modulation (QAM) signal generating apparatus.

Figure 3:
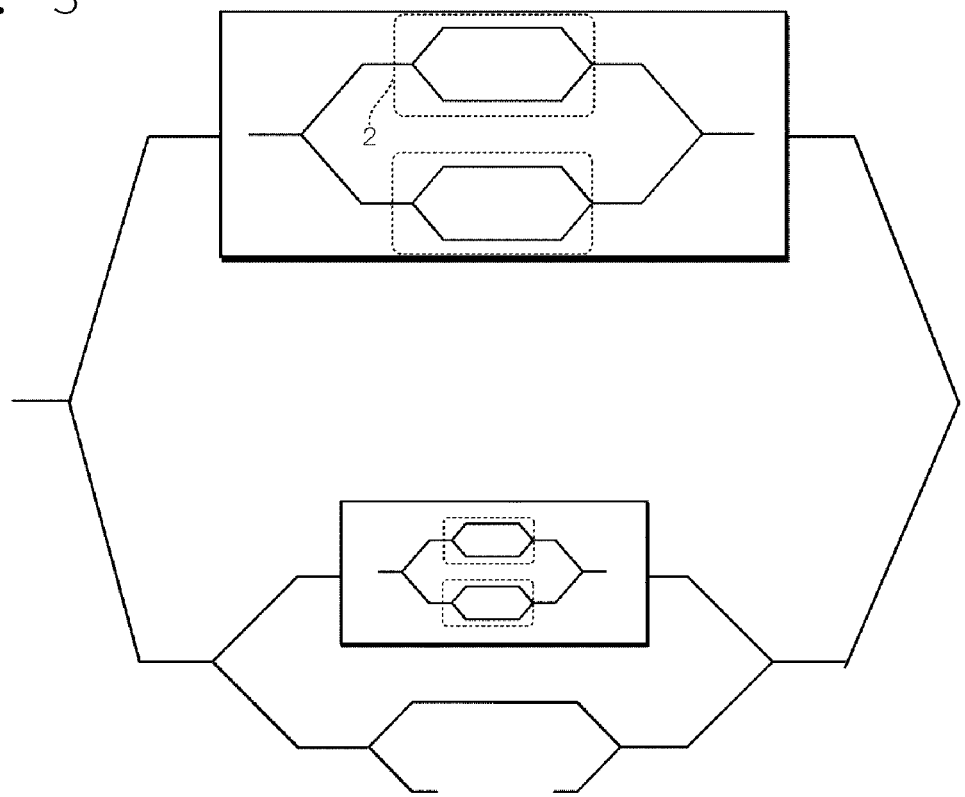
FIG. 3 is a diagram illustrating an example of an optical modulator including a plurality of Mach-Zehnder interferometers.

FIG. 3 is a diagram illustrating an example of an optical modulator including a plurality of Mach-Zehnder interferometers. As to this optical modulator, a plurality of modulators including a Mach-Zehnder waveguide is arranged.

A wave function of input light to the MZ interferometer can be expressed by $\exp(i\omega_0 t)$. A phase of the optical signal propagating through both the arms of the MZ interferometer can be expressed as follows.

$$A_1 \sin(\omega_m t + \phi_1) + B_1, A_2 \sin(\omega_m t + \phi_2) + B_2 \quad \text{[Mathematical Formula 1]}$$

In the above formula, $\omega_0$ represents an angular frequency of light, $A_1$ and $A_2$ represent parameters (modulation indexes) showing depths of modulation on the arms, $\omega_m$ represents an angular frequency of a modulation signal, $\phi_1$ and $\phi_2$ represent different phases of the modulation signals of the arms, and $B_1$ and $B_2$ represent phases of both the arms according to a structure and a state of the waveguide.

An output from the MZ interferometer can be expressed as follows.

[Mathematical Formula 2]

$$\frac{e^{i\omega_0 t}}{2}\left[\exp i\{A_1\sin(\omega_m t + \phi_1) + B_1\}\left(1+\frac{\eta}{2}\right) + \exp i\{A_2\sin(\omega_m t + \phi_2) + B_2\}\left(1-\frac{\eta}{2}\right)\right] =$$

-continued $$\frac{e^{i\omega_0 t}}{2}\sum_{n=-\infty}^{\infty} e^{in\omega_m t}\left[J_n(A_1)\exp(in\omega_m t + in\phi_1 + inB_1)\left(1+\frac{\eta}{2}\right) + J_n(A_2)\exp(in\omega_m t + in\phi_2 + inB_2)\left(1-\frac{\eta}{2}\right)\right] =$$

$$\frac{e^{i\omega_0 t}}{2}\sum_{n=-\infty}^{\infty} e^{in\omega_m t}\left[J_n(A_1)e^{in\phi_1} \cdot e^{iB_1}\left(1+\frac{\eta}{2}\right) + J_n(A_2)e^{in\phi_2} \cdot e^{iB_2}\left(1-\frac{\eta}{2}\right)\right]$$

In the above formula, n represents an order, and $\eta$ represents an extinction ratio relating to imbalance of light amplitude between the two arms. Further, $J_n$ is Bessel function of the first kind.

When a phase difference in an RF signal between the arms is ignored, $\phi_1 = \phi_2 = 0$ can be satisfied, $\alpha'$ is $A\alpha_0$, $A_1$ is $A+\alpha'$, and $A_2$ is $-A+\alpha'$. As a result, the output from the MZ interferometer can be expressed as follows. The characteristic evaluating method in the case where the phase difference between the RF signals between the arms cannot be ignored is described later.

[Mathematical Formula 3]

$$\frac{e^{i\omega_0 t}}{2}\sum_{n=-\infty}^{\infty} e^{in\omega_m t}\left[J_n(A+\alpha')e^{iB_1}\left(1+\frac{\eta}{2}\right) + J_n(-A+\alpha')e^{iB_2}\left(1-\frac{\eta}{2}\right)\right]$$

Therefore, the output at the time of bias null ($B_1=0$, $B_2=\pi$) is as follows.

[Mathematical Formula 4]

$$\frac{e^{i\omega_0 t}}{2}\sum_{n=-\infty}^{\infty} e^{in\omega_m t}\left[J_n(A+\alpha')\left(1+\frac{\eta}{2}\right) - (-1)^n J_n(A-\alpha')\left(1-\frac{\eta}{2}\right)\right]$$

Therefore, a zeroth-order component to a third-order component included in the output from the MZ interferometer at the time of bias null can be expressed as follows.

[Mathematical Formula 5]

$$\frac{1}{2}\left[J_0(A+\alpha')\left(1+\frac{\eta}{2}\right) - J_0(A-\alpha')\left(1-\frac{\eta}{2}\right)\right],$$

$$\frac{1}{2}\left[J_1(A+\alpha')\left(1+\frac{\eta}{2}\right) + J_1(A-\alpha')\left(1-\frac{\eta}{2}\right)\right] \cong J_1(A),$$

$$\frac{1}{2}\left[J_2(A+\alpha')\left(1+\frac{\eta}{2}\right) - J_2(A-\alpha')\left(1-\frac{\eta}{2}\right)\right],$$

$$\frac{1}{2}\left[J_3(A+\alpha')\left(1+\frac{\eta}{2}\right) + J_3(A-\alpha')\left(1-\frac{\eta}{2}\right)\right] \cong J_3(A)$$

Therefore, when $\eta$ is variable, $\eta$ is adjusted, whereby the zeroth-order component (carrier component) can be 0. When the carrier component is 0, the extinction ratio $\eta$ becomes as follows.

$$\eta = \frac{2\{-J_0(A+\alpha') + J_0(A-\alpha')\}}{J_0(A+\alpha') + J_0(A-\alpha')} \quad \text{[Mathematical Formula 6]}$$

Under the condition that the intensity of the zeroth-order component (carrier component) becomes 0, the intensity of the second-order component becomes as follows

[Mathematical Formula 7]

$$\frac{1}{2}\Big[J_2(A+\alpha') - J_2(A-\alpha') +$$
$$\frac{-J_0(A+\alpha')+J_0(A-\alpha')}{J_0(A+\alpha')+J_0(A-\alpha')}(J_2(A+\alpha')+J_2(A-\alpha'))\Big] \cong$$
$$\frac{1}{2}\Big(J'_2(A)\cdot 2\alpha' - J'_0(A)\frac{J_2(A)}{J_0(A)}\cdot 2\alpha'\Big) \cong \alpha'\Big(J'_2(A) - J'_0(A)\frac{J_2(A)}{J_0(A)}\Big)$$

$J_n^\circ = J_{n-1}(A) - nJ_n(A)/A$ is satisfied. On the other hand, an intensity ratio between a second-order component and a first-order component is $R_{12}$. As a result, $R_{12}$ becomes as follows.

$$\alpha'\Big(J'_2(A) - J'_0(A)\frac{J_2(A)}{J_0(A)}\Big)\cdot\frac{1}{J_1(A)} \qquad \text{[Mathematical Formula 8]}$$

Therefore, the intensities of the second-order component and first-order component are obtained so that the extinction ratio η, α' and A can be obtained.

The method according to the first aspect is based on the above principle. That is, the method according to the first aspect includes a step of adjusting bias voltage, a step of eliminating the zeroth-order component, a step of measuring output intensity, and a step of evaluating characteristics.

At the step of adjusting bias voltage, the phase difference between the bias voltages to be applied to the two arms of the MZ interferometer is adjusted to be π. This step can be achieved by adjusting a voltage to be applied to a bias electrode. This step may be automatically executed based on a control device. That is, the optical modulator includes, for example, a bias source and the control device. The control device reads a control program. The control device gives a command to the bias source based on the read control program. The bias source receives the command from the control device. The bias source applies a bias voltage to the electrode of the MZ interferometer according to the control command. In such a manner, the phase difference between the bias voltages to be applied to the two arms of the MZ interferometer can be it. Normally, a bias-full state and a bias-null state are controlled by using the intensity of the zeroth-order component of the output light. On the other hand, when the optical modulator includes MZ interferometers other than the MZ interferometer to be evaluated, a noise originating from the other MZ interferometers is generated in the zeroth-order component. It is, therefore, difficult to accurately distinguish the bias-full state from the bias-null state using the zeroth-order component. Therefore, it is preferable to distinguish the bias-full state from the bias-null state using a high-order component. In the case of the bias-full state, the bias voltage may be adjusted so that even-order (second-order, fourth-order, sixth-order, etc.) components become maximum and odd-order including first-order (first-order, third-order, fifth-order, etc.) components become minimum. Further, in the case of the bias-null state, the bias may be set so that the odd-order including first-order (first-order, third-order, fifth-order, etc.) components become maximum, and the even-order including zeroth-order (second-order, fourth-order, sixth-order, etc.) components become minimum. That is, in order to set the phase difference between the bias voltages to be applied to the two arms of the MZ interferometer to π, the bias-null state needs to be obtained. For this reason, the bias may be set so that the odd-order including first-order (first-order, third-order, fifth-order, etc.) components become maximum and the even-order including zeroth-order (second-order, fourth-order, sixth-order, etc.) components become minimum. For example, a control may be made so that only the first-order component becomes maximum. Further, the control may be made so that only the second-order component becomes minimum. That is, a preferable pattern of the method according to the first aspect is such that the bias voltage is adjusted so that the odd-order components of the output light from the MZ interferometer become maximum and the even-order components other than the zeroth-order component become minimum. As a result, the phase difference between bias voltages to be applied to the two arms of the MZ interferometer is set to π. This step can be achieved by analyzing a spectrum to be detected by a light detector and simultaneously adjusting the bias voltages. Further, the control section may automatically analyze a spectrum detected by the light detector and give a command for changing the bias voltages to the bias source. In such a system, the bias-null state can be automatically obtained. In an easier manner, the bias voltage may be adjusted so that the first-order component of the output light from the MZ interferometer becomes maximum. Alternatively, the bias voltage may be adjusted so that the second-order component of the output light from the MZ interferometer becomes minimum, in such a manner, the phase difference between the bias voltages can be effectively controlled without being influenced by the other MZ interferometers.

At the step of eliminating the zeroth-order component, the optical modulator is adjusted so that the intensity of the zeroth-order component of the output light from the MZ interferometer becomes 0. This step may be executed by monitoring the output from the MZ interferometer and simultaneously finely adjusting the bias voltages. Further, the step may be automatically executed based on the control device. Such an optical modulator includes, for example, a light detector. The light detector measures output light from the MZ interferometer. The light detector acquires intensity information about a carrier component (zeroth-order component) from the spectrum of the detected output light. Specifically, intensity of a carrier frequency component included in the spectrum is extracted. The light detector transmits the intensity information about the carrier component to the control device. The control device gives a command to the bias source based on the input intensity information about the carrier component. The bias source applies a bias voltage to the electrode of the MZ interferometer according to the control command. This operation is repeated until the intensity of the zeroth-order component becomes 0 or becomes a predetermined value (first value) that is substantially 0. In such a manner, the zeroth-order component can be eliminated.

At the step of measuring the output intensity, the intensity of the first-order component and the intensity of the second-order component included in the output light from the MZ interferometer, from which the zeroth-order component has been eliminated at the step of eliminating the zeroth-order component, are obtained. The frequency of the first-order component is $f_0+f_m$ (the carrier frequency is $f_0$ and the modulation frequency is $f_m$). Therefore, the intensity of the first-order component can be easily obtained from the output spectrum of the light detector. Since the frequency of the second-order component is $f_0+2f_m$, the intensity of the second-order component can be easily obtained from the output spectrum of the light detector.

The step of measuring the output intensity may be automatically executed by using the control device. Specifically, when the intensity of the first-order component is obtained, a peak around $f_0+f_m$ in the spectrum of the output light may be obtained. Further, after the peak included in the spectrum is fitted by Gaussian or the like, an area is obtained by using integration so that the intensity may be obtained.

At the step of evaluating the characteristics, the characteristics of the MZ interferometer are evaluated by using the intensity of the first-order component and the intensity of the second-order component measured at the output intensity measuring step. As described above, when the intensities of the second-order component and the first-order component are obtained, the extinction ratio η, α' and A can be obtained. This step also may be automatically executing by using the control device. As such a control device, devices having a program for solving a simultaneous equation and a program for handling a Bessel function can be used.

The method according to the first aspect is for evaluating the characteristics of the MZ interferometer without using the zeroth-order component included in the output light. For this reason, the characteristics of a certain MZ interferometer in the optical modulator including a plurality of MZ interferometers can be effectively evaluated.

In a preferable pattern of the method according to the first aspect, the above-described MZ interferometer is the first MZ interferometer. The optical modulator further includes the second MZ interferometer. The second MZ interferometer is different from the first MZ interferometer.

The present invention enables the effective evaluation of the characteristics of a certain MZ interferometer in the optical modulator including a plurality of MZ interferometers.

In a preferable pattern of the method according to the first aspect, RF signals are applied to the two arms of the MZ interferometer and skew (phase difference) is provided to the RF signals, so that the accurate bias-null state is confirmed. When the accurate bias-null state is not obtained, the bias is adjusted, in such a manner, the accurate bias-null state can be obtained, so that the characteristics of the MZ interferometer can be accurately evaluated. This is described below.

When the RF signals are applied to the two arms of the MZ interferometer, skew (phase difference) occasionally occurs in the RF signals. Due to the skew, light spectrum changes. For this reason, normally adjustment is made so that the skew becomes as small as possible. On the other hand, when a state that the light spectrum changes due to the skew is actually measured, it is found that every order component has periodicity (symmetric property). That is, an n-order component has a zero point in $2\pi/n$ cycle. As a result, the n-order component can be easily separated from the output spectrum. The output spectrum has the periodicity for the following reasons. That is, when B represents a bias phase difference and φ represents the skew, the intensity of the n-order component is proportional to $\cos[\{n(\phi+\pi)+B\}/2]$. For this reason, it is considered that the n-order component has the zero point in $2\pi/n$ cycle.

As a result of actual output, an upper sideband (USB) and a lower sideband (LSB) are imbalanced at a bias point between bias null and bias full. On the other hand, a symmetric property is maintained between USB and LSB in bias full or bias null. That is, the intensities of USB and LSB are approximately equal to each other even when the skew changes.

Figure 4:
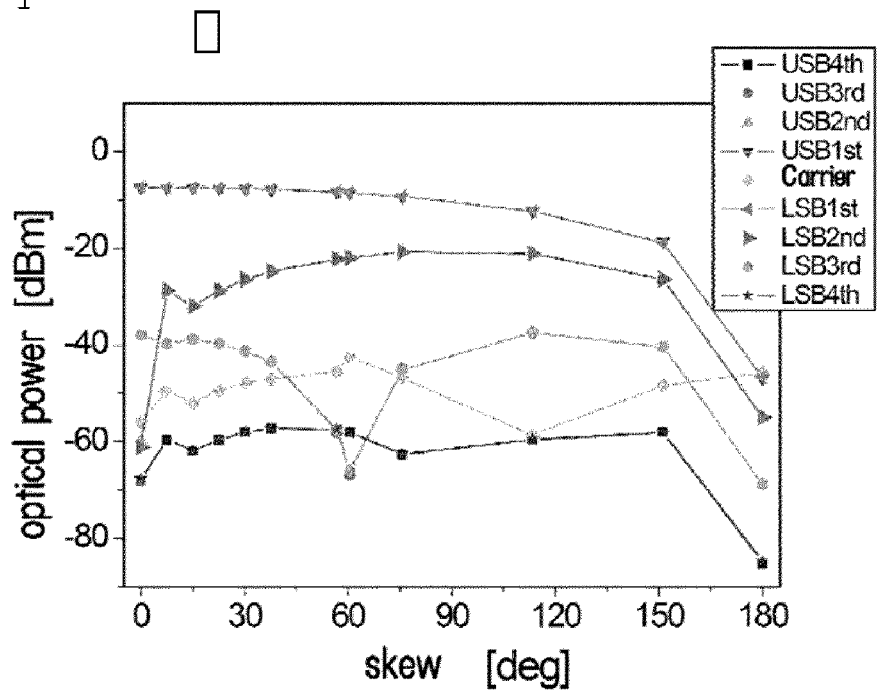
FIG. 4 is a graph instead of a diagram illustrating a relationship between the output from the MZ interferometer and the skew in the case of bias null.

FIG. 4 is a graph instead of a diagram illustrating a relationship between the output from the MZ interferometer and the skew in the case of bias null (null bias). FIG. 4 illustrates the output from the MZ interferometer in the case of DSB-SC modulation. In FIG. 4, it is found that even when the skew changes, the carrier component is continuously suppressed. When the skew becomes 180°, the light intensity reduces as a whole. This is considered to be because optical phases are inverted between the two arms. That is, components whose phases are inverted interfere with each other and are cancelled, thereby weakening the entire light intensity. The first-order component (and minus first-order component) becomes maximum when the skew is 0°, and becomes minimum when the skew becomes 180°. An interval between the zero points is 360° ($2\pi$). The intensities of the first-order component and the minus first-order component are approximately equal to each other in each skew, and the symmetric property is maintained between the first-order component and the minus first-order component. The second-order component (minus second-order component) becomes minimum when the skew is 0°, and becomes minimum when the skew is 180°. The interval between the zero points is 180° ($2\pi/2$). The intensities of the second-order component and the minus second-order component are approximately equal to each other in each skew, and the symmetric property is maintained between the second-order component and the minus second-order component. The third-order component (minus third-order component) becomes maximum when the skew is 0°, and becomes infinitesimal when the skew is 60° and 180°. The interval between the zero points is 120° ($2\pi/3$). The intensities of the third-order component and the minus third-order component are approximately equal to each other at each skew, and the symmetric property is maintained between the third-order component and the minus third-order component.

Figure 5:
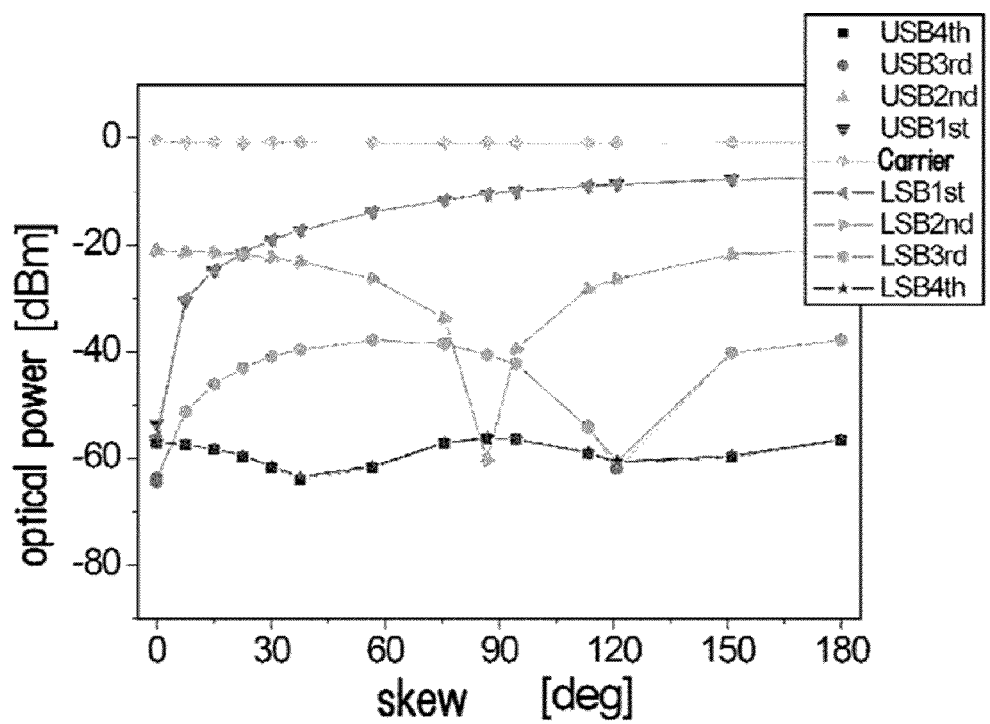
FIG. 5 is a graph instead of a diagram illustrating a relationship between the output from the MZ interferometer and the skew in the case of bias full.

FIG. 5 is a graph instead of a diagram illustrating a relationship between the output from the MZ interferometer and the skew in the case of bias full (full bias). FIG. 5 illustrates the output from the MZ interferometer in the case where odd-order components are suppressed. In FIG. 5, it is found that even when the skew changes, the intensity of the carrier component does not change. When the skew increases from 0, the intensity of the suppressed first-order component (and minus first-order component) increases. The first-order component (and minus first-order component) becomes maximum when the skew is 0°, and becomes minimum when the skew becomes 180°. An interval between the zero points is 360° ($2\pi$). The intensities of the first-order component and the minus first-order component are approximately equal to each other in each skew, and the symmetric property is maintained between the first-order component and the minus first-order component. The second-order component (minus second-order component) becomes minimum when the skew is 0°, and becomes minimum when the skew is 90°. The interval between the zero points is 180° ($2\pi/2$). The intensities of the second-order component and the minus second-order component are approximately equal to each other in each skew, and the symmetric property is maintained between the second-order component and the minus second-order component. The third-order component (minus third-order component) becomes maximum when the skew is 0°, and becomes infinitesimal when the skew is 120°. The interval between the zero points is 120° ($2\pi/3$). The intensities of the third-order component and the minus third-order component are approximately equal to each other at each skew, and the symmetric property is maintained between the third-order component and the minus third-order component.

Therefore, when a difference between the intensity of USB and the intensity of LSB is in a constant range, it can be determined that bias null or bias full is achieved. The constant range may be suitably set. When this range is narrow, the bias null or the bias full can be achieved more accurately.

That is, in a preferable pattern from the first aspect, the step of setting the phase difference between the bias voltages to be applied to the two arms of the MZ interferometer to π includes a step of applying signals having skew to the two arms. The skew is a phase difference between RF (Radio Frequency)

signals (modulation signals) to be applied to the two arms. The skew may be controlled in the following manner. That is, an RF signal source is connected to the control device. The RF signal source is connected to an electrode for applying the modulation signals to the two arms. The control section gives a command for causing the RF signal source to output the RF signals. This command takes the phase difference between the RF signals to be applied to the two arms into consideration. As a result, the phase difference (skew) between the RF signals to be applied to the two arms can be controlled. Further, the control section sweeps the phase difference so as to be capable of sweeping the skew (namely, the phase difference between the RF signals to be applied to the two arms). While the skew is being swept, the outputs from the MZ interferometer are measured. In this state, a determination is made whether the symmetric property is maintained between the measured outputs from the MZ interferometer. The light detector is connected to the control device. Therefore, the output spectrum detected by the light detector is input into the control device.

The control device separates respective order components from the output spectrum. The control device determines whether the n-order component and the minus n-order component have the similar intensity. For example, a ratio between the intensity of the first-order component and the intensity of the minus first-order intensity is obtained, and a determination is made whether this ratio is 0.95 or more and 1.05 or less. This range may be suitably adjusted. As a result, the determination is made whether the symmetric property is maintained between the outputs from the MZ interferometer.

When the determination is made that the symmetric property is maintained between the outputs from the MZ interferometer, a determination is made that the phase difference between the bias voltages is $\pi$. On the other hand, when the determination is made that the symmetric property is not maintained between the outputs from the MZ interferometer, the determination is made that the phase difference between the bias voltages is not $\pi$. As a result, the bias point can be confirmed as being accurately bias null.

In a preferable pattern of the invention according to the first aspect, the step of setting the phase difference between the bias voltages to be applied to the two arms of the MZ interferometer to $\pi$ includes a step of applying signals having skew to the two arms. The outputs from the MZ interferometer at the time of sweeping the skew are measured. Further, the step includes a step of determining whether a difference between the intensity of the first-order component and the intensity of the minus first-order component in the measured outputs from the MZ interferometer is within a constant range. That is, if the first-order component and the minus first-order component maintain the similar intensity even when the skew changes, the symmetric property is maintained between the first-order component and the minus first-order component. Therefore, according to this pattern, the accurate bias null can be confirmed.

In a preferable pattern of the invention according to the first aspect, the step of setting the phase difference between the bias voltages to be applied to the two arms of the MZ interferometer to $\pi$ includes a step of applying signals having skew to the two arms. The outputs from the MZ interferometer at the time of sweeping the skew are measured. Further, the step includes a step of determining whether a difference between the intensity of the second-order component and the intensity of the minus second-order component in the measured outputs from the MZ interferometer is within a constant range. That is, if the second-order component and the minus second-order component maintain the similar intensity even when the skew changes, the symmetric property is maintained between the second-order component and the minus second-order component. Therefore, according to this pattern, the accurate bias null can be confirmed.

A second aspect of the present invention relates to a method for evaluating the characteristics of the optical modulator including the Mach-Zehnder interferometer (MZ interferometer). The MZ interferometer includes a branching section, two arms, a coupling section, and an electrode. The two arms are connected to the branching section. The coupling section is connected to the two arms. The electrode can apply bias voltages to the two arms, and apply modulation signals to the two arms.

As described before, the output from the MZ interferometer can be expressed as follows.

[Mathematical Formula 9]

$$\frac{e^{i\omega_0 t}}{2} \sum_{n=-\infty}^{\infty} e^{in\omega_m t}\left[J_n(A+\alpha')e^{iB_1}\left(1+\frac{\eta}{2}\right)+J_n(-A+\alpha')e^{iB_2}\left(1-\frac{\eta}{2}\right)\right]$$

Therefore, the output at the time of the bias full ($B_1=B_2=0$) is as follows.

[Mathematical Formula 10]

$$\frac{e^{i\omega_0 t}}{2} \sum_{n=-\infty}^{\infty} e^{in\omega_m t}\left[J_n(A+\alpha')\left(1+\frac{\eta}{2}\right)+(-1)^n J_n(A-\alpha')\left(1-\frac{\eta}{2}\right)\right]$$

Therefore, a zeroth-order component to a third-order component included in the output from the MZ interferometer at the time of the bias full can be expressed as follows, respectively.

[Mathematical Formula 11]

$$\frac{1}{2}\left[J_0(A+\alpha')\left(1+\frac{\eta}{2}\right)+J_0(A-\alpha')\left(1-\frac{\eta}{2}\right)\right] \cong J_0(A),$$

$$\frac{1}{2}\left[J_1(A+\alpha')\left(1+\frac{\eta}{2}\right)-J_1(A-\alpha')\left(1-\frac{\eta}{2}\right)\right],$$

$$\frac{1}{2}\left[J_2(A+\alpha')\left(1+\frac{\eta}{2}\right)+J_2(A-\alpha')\left(1-\frac{\eta}{2}\right)\right] \cong J_2(A),$$

$$\frac{1}{2}\left[J_3(A+\alpha')\left(1+\frac{\eta}{2}\right)-J_3(A-\alpha')\left(1-\frac{\eta}{2}\right)\right]$$

When $\eta$ is variable, $\eta$ is adjusted whereby the first-order component can be 0. When the first-order component is 0, the extinction ratio $\eta$ can be expressed as follows.

[Mathematical Formula 12]

$$\eta = \frac{2\{-J_1(A+\alpha')+J_1(A-\alpha')\}}{J_1(A+\alpha')+J_1(A-\alpha')}$$

Under this condition, the intensity of the third-order component becomes as follows.

[Mathematical Formula 13]

$$\frac{1}{2}\Big[J_3(A+\alpha')-J_3(A-\alpha')+$$

-continued $$\frac{-J_1(A+\alpha')+J_1(A-\alpha')}{J_1(A+\alpha')+J_1(A-\alpha')}(J_3(A+\alpha')+J_3(A-\alpha'))\Big] \cong$$

$$\alpha'\left(J_3'(A)-J_1'(A)\frac{J_3(A)}{J_1(A)}\right)$$

On the other hand, an intensity ratio between the third-order component and the second-order component becomes as follows.

[Mathematical Formula 14]

$$\cong \alpha_0 A\left(J_3'(A)-J_1'(A)\frac{J_3(A)}{J_1(A)}\right) \cdot \frac{1}{J_2(A)} =$$

$$\alpha_0\left(AJ_2(A)-3J_3(A)-(AJ_0(A)-J_1(A))\frac{J_3(A)}{J_1(A)}\right) \cdot \frac{1}{J_2(A)} =$$

$$\frac{\alpha_0(AJ_1(A)J_2(A)-3J_1(A)J_3(A)-AJ_0(A)J_3(A)+J_1(A)J_3(A))}{J_1(A)J_2(A)} =$$

$$\frac{\alpha_0(AJ_1(A)J_2(A)-2J_1(A)J_3(A)-AJ_0(A)J_3(A))}{J_1(A)J_2(A)}$$

Therefore, when the intensities of the third-order component and the second-order component are obtained, the extinction ratio $\eta$, $\alpha'$ and A can be obtained.

The method according to the second aspect includes a step of adjusting bias voltage, a step of eliminating a first-order component, a step of measuring output intensity and a step of evaluating characteristics. Basically, the method according to the first aspect may be suitably modified so as to be used.

At the step of adjusting bias voltage, a phase difference between bias voltages to be applied to the two arms of the MZ interferometer is set to 0. This step is similar to that according to the first aspect. In a preferable pattern of the method according to the second aspect, the bias voltage is adjusted so that odd-order components of output light from the MZ interferometer become minimum and even-order components other than the zeroth-order component become maximum. As a result, the phase difference between the bias voltages to be applied to the two arms of the MZ interferometer can be 0. Further, in order to make easy control, the bias voltages may be adjusted so that the first-order component of the output light from the MZ interferometer becomes minimum. Further, the bias voltages may be adjusted so that the second-order component of the output light from the MZ interferometer becomes maximum. As a result, the phase difference between the bias voltages to be applied to the two arms of the MZ interferometer can be easily 0.

At the step of eliminating the first-order component, the optical modulator is adjusted so that the intensity of the first-order component of the output light from the MZ interferometer becomes 0. At this step, the output light is detected, and the bias voltages may be adjusted so that the intensity of the first-order component becomes 0.

At the step of measuring the output intensity, the intensity of the second-order component and the intensity of the third-order component included in the output light from the MZ interferometer, from which the first-order component has been eliminated at the first-order component eliminating step, are obtained. At this step, the intensity of the second-order component and the intensity of the third-order component may be obtained in the same manner as described above.

At the step of evaluating characteristics, the characteristics of the MZ interferometer are evaluated by using the intensity of the second-order component and the intensity of the third-order component measured at the output intensity measuring step. As described above, in the bias-full condition, the first-order component is 0, and the intensities of the third-order component and the second-order component are obtained, whereby the extinction ratio $\eta$, $\alpha'$ and A can be obtained.

The method according to the second aspect is for evaluating the characteristics of the MZ interferometer without using the zeroth-order component included in the output light. For this reason, the characteristics of a certain MZ interferometer in the optical modulator including a plurality of MZ interferometers can be effectively evaluated.

In a preferable pattern of the method according to the second aspect, the above-described MZ interferometer is a first MZ interferometer. In this case, the optical modulator further includes a second MZ interferometer. The second MZ interferometer is different from the first MZ interferometer.

According to the present invention, the characteristics of a certain MZ interferometer in the optical modulator including a plurality of MZ interferometers can be effectively evaluated.

In a preferable pattern of the method according to the second aspect, the bias-null state is accurately obtained by using skew. Basically, similarly to the principle described in the first aspect, the bias-null state can be accurately achieved. Specifically in this pattern, the step of setting the phase difference between the bias voltages to be applied to the two arms of the MZ interferometer to 0 includes a step of applying signals having skew to the two arms. The skew is a phase difference between RF (Radio Frequency) signals (modulation signals) to be applied to the two arms. The skew (namely, the phase difference between the RF signals to be applied to the two arms) is swept. While the skew is being swept, outputs from the MZ interferometer are measured. In this state, a determination is made whether the measured outputs from the MZ interferometer maintain a symmetric property. When the determination is made that the outputs from the MZ interferometer maintain the symmetric property, a determination is made that the phase difference between the bias voltages is 0. On the other hand, when the determination is made that the outputs from the MZ interferometer do not maintain the symmetric property, the determination is made that the phase difference between the bias voltages is not 0. As described later, in such a manner, it can be confirmed that the bias point is accurately bias full.

In a preferable pattern of the method according to the second aspect, the step of setting the phase difference between the bias voltages to be applied to the two arms of the MZ interferometer to 0 includes a step of applying signals having skew to the two arms. Outputs from the MZ interferometer in the case of sweeping the skew are measured. This step includes a step of determining whether a difference between the intensity of a first-order component and the intensity of a minus first-order component in the measured outputs from the MZ interferometer is in a constant range. That is, when the first-order component and the minus first-order component maintain the similar intensity even if the skew changes, the symmetric property between the first-order component and the minus first-order component is maintained. Therefore, according to this pattern, the bias full can be accurately confirmed.

In a preferable pattern of the method according to the second aspect, the step of setting a phase difference between the bias voltages to be applied to the two arms of the MZ interferometer includes the step of applying the signals having skew to the two arms. Outputs from the MZ interferometer in the case of sweeping the skew are measured. This step further includes a step of determining whether the difference between the intensity of a second-order component and the intensity of a minus second-order component in the measured outputs from the MZ interferometer is in a constant range. That is, when the second-order component and the minus second-order component maintain the similar intensity even if the skew changes, the symmetric property between the second-order component and the minus second-order component is maintained. Therefore, according to this pattern, the bias full can be accurately confirmed.

When η is not variable, the characteristics of the Mach-Zehnder interferometer may be evaluated in the following manner. The intensities of respective sidebands in the bias-full and bias-null states are measured. In this case, the respective intensities (relative value) can be expressed by the formulas shown above. Therefore, a plurality of simultaneous nonlinear equations can be written by using these data. When the simultaneous equations whose number is larger than variables are written so that the variables can be obtained. Therefore, three or more simultaneous equations are written, and are solved so that A, α and η can be obtained. As described before, when a plurality of MZ interferometers are provided, noises originating from the MZ interferometers other than the one to be measured are generated in a zeroth-order component. Therefore, in order to evaluate the MZ interferometer, it is desirable to use a ratio between the first-order, second-order or third or more-order sideband components. The nonlinear simultaneous equations occasionally have a plurality of solutions. In this case, four or more simultaneous equations are written so that the solutions can be easily obtained.

A method according to the third aspect includes a step of adjusting bias voltage, a step of measuring output intensity, and a step of evaluating characteristics. At the step of adjusting bias voltage, a voltage is set to be in the middle of a voltage with which a phase difference between the bias voltages to be applied to the two arms of the MZ interferometer becomes 0 and a voltage with which the phase difference becomes π. As to the method for obtaining the voltages whose phase difference becomes 0 and π, the above-described methods may be suitably used. Further, the optical modulator may be automatically controlled by using the control device. The control device gives a command to the bias source so that the voltages whose phase difference becomes 0 and becomes π are stored, their average is obtained, and a bias voltage of this average value is output. At the step of measuring output intensity, intensities of high-order components included in the output light from the MZ interferometer are obtained. At the step of evaluating characteristics, the characteristics of the MZ interferometer are evaluated by using a ratio between the high-order components measured at the output intensity measuring step. That is, according to the present invention, the characteristics of the MZ interferometer can be evaluated by using an intermediate state between bias full and bias null. In this case, the intensities of the respective sidebands become the average expressed by the above formula. Therefore, the sideband intensities of the first or more-order components (high-order components) are obtained, and a simultaneous equation is written by using the ratio, so that a variable may be obtained. The variable is a value representing the characteristics of the MZ interferometer. Also in this aspect, the optical modulator including a plurality of MZ interferometers can be effectively evaluated. The method according to the third aspect may be also controlled automatically. A system having such an optical modulator includes an optical modulator, a light detector, a power source, and a control device. The power source applies a modulation signal and a bias voltage to the optical modulator. The light detector is configured to measure the output from the optical modulator or the output from the MZ interferometer included in the optical modulator. The control device is connected to the light detector, and can receive spectrum information detected by the light detector. Further, the control device controls an operation of the power source based on the received spectrum information.

When the phase difference between the RE signals between the arms cannot be ignored, the phase difference between the RE signals may be evaluated as follows. That is, characteristics may be evaluated by using the above-described intermediate state between bias full and bias null. That is, when the phase difference between the RF signals between the arms cannot be ignored, the intensity of +n-order components and the intensity of −n-order components are imbalanced in the bias voltage between bias full and bias null. The phase difference between the RF signals between the arms can be evaluated by using the ratio between the +n-order components and the −n-order components. That is, when the ratio takes a value in a constant range near 1, the phase difference between the RF signals between the arms can be ignored. On the other hand, when the ratio between the in-order components and the −n-order components shifts from 1, the phase difference is large by this shift. That is, the ratio between the +n-order components and the −n-order components is obtained in the intermediate state between bias full and bias null, so that the phase difference between the RF signals between the arms can be evaluated.

The fourth aspect of the present invention relates to a method for obtaining skew of the Mach-Zehnder interferometer (MZ interferometer) included in the optical modulator. The MZ interferometer includes a branching section, two arms, a coupling section and an electrode. The two arms are connected to the branching section. The coupling section is connected to the two arms. The electrode can apply bias voltages to the two arms, and can apply modulation signals to the two arms.

In this aspect, the phase difference between the bias voltages to be applied to the two arms includes one or a plurality of kinds thereof, and bias voltages are applied, and the outputs from the MZ interferometer are measured for respective phases of the bias voltages. That is, the bias voltages are applied so that the phase difference between the bias voltages becomes a predetermined value, and the measurement of the output at that time is repeated. Further, the bias voltages with a plurality of phase differences may be applied at a stroke. As described above, according to the actually measured data, when B represents a bias phase difference and φ represents skew, it is considered that the intensity of the n-order components is proportional to $\cos[\{n\phi+\pi\}+B\}/2]$. Variables in this formula are φ and B. Therefore, the n-order components in the case where B (bias phase difference) is changed are obtained, so that φ (namely, $\phi_1-\phi_2$: the phase of the modulation signal to be applied to the first arm in the two arms of the MZ interferometer is represented by and the phase of the modulation signal to be applied to the second arm in the two arms of the MZ interferometer is represented by $\phi_2$) can be obtained.

The operation for obtaining φ may be automatically performed. That is, the bias source is connected to the control device. The control device is connected to the light detector. The control device can suitably adjust the phase difference between the bias voltages to be applied to the two arms. That is, the control device gives a command to the bias source so that the bias voltages to be applied to the two arms have a predetermined Phase difference. As a result, the bias source applies a predetermined voltage to the electrode, of the MZ interferometer according to the command. As result, the bias voltages to be applied to the two arms have the predetermined phase difference. The output from the MZ interferometer at the time of applying the bias voltages having the predetermined phase difference is measured. The measured output spectrum is output to the control device. The control device stores the output spectrum. At this time, it is preferable that the output intensity of each n-order component be extracted from the output spectrum and stored. The phase difference between the bias voltages is changed and the above operation is performed. This operation is repeated a predetermined number of times. In such a manner, the intensity of the n-order component at the time of sweeping the phase difference between the bias voltages can be measured so as to be stored. Thereafter, the simultaneous equation relating to $\cos[\{n(\phi+\eta)+B\}/2]$ is solved so that $\phi$ can be obtained. This operation also may be performed automatically by the control device. Specifically, a program for obtaining $\cos[\{n(\phi+\pi)+B\}/2]$ is stored in the main memory of the control device. The control device reads information about the intensity of the n-order component and B stored in the storage device. The control device gives a command for causing an arithmetic device to solve $\cos[\{n(\phi+\pi)+B\}/2]$ based on the command of the control program and obtain $\phi$. In such a manner, $\phi$ can be automatically obtained. That is, according to this aspect, the skew of the MZ interferometer can be obtained by using the measured outputs form the MZ interferometer. In such a manner, the skew of the MZ interferometer included in the optical modulator can be obtained. Also in this aspect, the apparatus according to the above-described aspect can be suitably used.

A plurality of nonlinear simultaneous equations is written by using the mathematical formula 2, so that $\phi$ may be obtained. That is, the output spectrum from the MZ interferometer is measured so that an absolute value of a sideband (for example, a k-order component) can be obtained. This measured value is equal to n=k in an element in $\Sigma$ the mathematical formula 2. Therefore, some output spectra in B are measured, and the simultaneous equation is solved so that $\phi$ can be obtained. Some output spectra in $\phi$ are obtained, and the simultaneous equation is written so that B can be obtained.

INDUSTRIAL APPLICABILITY

The present invention is suitably used in the field of optical information communication.

The invention claimed is:

1. A method for evaluating characteristics of an optical modulator including a first Mach-Zehnder, MZ, interferometer, wherein
   the MZ interferometer includes a branching section, two arms, a coupling section, and electrodes,
   the two arms are connected to the branching section,
   the coupling section is connected to the two arms,
   the electrodes make it possible to apply bias voltages to the two arms,
   the electrodes make it possible to apply modulation signals to the two arms,
   the method comprises a step of adjusting bias voltage, a step of eliminating zeroth-order component, a step of measuring output intensity, and a step of evaluating characteristics,
   the step of adjusting bias voltage is a step for adjusting phase difference between the bias voltages to be applied to the two arms of the MZ interferometer to be $\pi$,
   the step of eliminating zeroth-order component is a step for adjusting an extinction ratio $\eta$ of the optical modulator, the extinction ratio $\eta$ relating to imbalance of light amplitude between the two arms, such that the intensity of zeroth-order component of the output light from the MZ interferometer becomes 0,
   the step of measuring the output intensity is a step for obtaining the intensity of first-order component and the intensity of second-order component included in the output light from the MZ interferometer, the zeroth-order component of the output light having been eliminated at the step of eliminating the zeroth-order component,
   the step of evaluating the characteristics is a step for evaluating the characteristics of the MZ interferometer by using the intensity of the first-order component and the intensity of the second-order component measured at the output intensity measuring step.

2. The method in accordance with claim 1,
   wherein the optical modulator further comprises a second MZ interferometer, and
   the second MZ interferometer is different from the first MZ interferometer.

3. The method in accordance with claim 1,
   wherein the characteristics of the MZ interferometer includes imbalance of light amplitude between the two arms.

4. The method in accordance with claim 1,
   wherein the characteristics of the MZ interferometer includes a chirp parameter and a modulation index.

5. The method in accordance with claim 1,
   wherein at the step of adjusting bias voltage, the bias voltage is adjusted so that the odd-order components of the output light from the MZ interferometer become maximum and the even-order components other than the zeroth-order component become minimum.

6. The method in accordance with claim 1,
   wherein at the step of adjusting bias voltage, the bias voltage is adjusted so that a first-order component of the output light from the interferometer becomes maximum or the second-order component becomes minimum.

7. The method in accordance with claim 1,
   wherein the step of adjusting bias voltage comprises:
   a step of applying signals having skew to the two arms;
   a step of measuring output signal from the MZ interferometer when the skew is swept;
   a step of determining whether the output signal maintains symmetric property; and
   a step of determining a phase difference between bias voltages, the phase difference being assessed as $\pi$ when the output signal maintains symmetric property and the phase difference being assessed as not $\pi$ when the output signal does not maintain symmetric property.

8. The method in accordance with claim 1,
   wherein the step of adjusting bias voltage comprises:
   a step of applying signals having skew to the two arms;
   a step of measuring output signal from the MZ interferometer when the skew is swept;
   a step of determining whether the output signal maintains symmetric property; and
   a step of determining whether a difference between the intensity of a first-order component and the intensity of a minus first-order component in the signals output from the MZ interferometer is within a predetermined range.

9. The method in accordance with claim 1,
   wherein the step of adjusting bias voltage comprises:
   a step of applying signals having skew to the two arms;
   a step of measuring output signal from the MZ interferometer when the skew is swept;
   a step of determining whether the output signal maintains symmetric property; and a step of determining whether a difference between the intensity of a second-order component and the intensity of a minus second-order component in the signals output from the MZ interferometer is within a predetermined range.

10. A method for evaluating characteristics of an optical modulator including a first Mach-Zehnder interferometer, MZ interferometer,
wherein the MZ interferometer includes a branching section, two arms, a coupling section, and electrodes,
the two arms are connected to the branching section,
the coupling section is connected to the two arms,
the electrodes make it possible to apply bias voltages to the two arms,
the electrodes make it possible to apply modulation signals to the two arms,
the method comprises a step of adjusting bias voltage, a step of eliminating a first-order components, a step of measuring output intensity, and a step of evaluating characteristics,
the step of adjusting bias voltage is a step for adjusting the phase difference between the bias voltages to be applied to the two arms of the MZ interferometer to be 0,
the step of eliminating the first-order component is a step for adjusting an extinction ratio of the optical modulator, the extinction ratio $\eta$ relating to imbalance of light amplitude between the two arms, such that the intensity of the first-order component of the output light from the MZ interferometer becomes 0,
the step of measuring the output intensity is a step for obtaining the intensity of a second-order component and the intensity of a third-order component included in the output light from the MZ interferometer, the first-order component of the output light having been eliminated at the step of eliminating the first-order component,
the step of evaluating the characteristics is a step for evaluating the characteristics of the MZ interferometer by using the intensity of the second-order component and the intensity of the third-order component measured at the output intensity measuring step.

11. The method in accordance with claim 10,
wherein the optical modulator further comprises a second MZ interferometer, and
the second MZ interferometer is different from the first MZ interferometer.

12. The method in accordance with claim 10,
wherein the characteristics of the MZ interferometer includes imbalance of light amplitude between the two arms.

13. The method in accordance with claim 10,
wherein the characteristics of the MZ interferometer includes a chirp parameter and a modulation index.

14. The method in accordance with claim 10,
wherein at the step of adjusting bias voltage, the bias voltage is adjusted so that the odd-order components of the output light from the MZ interferometer become minimum and the even-order components other than the zeroth-order component become maximum.

15. The method in accordance with claim 10,
wherein at the step of adjusting bias voltage, the bias voltage is adjusted so that the first-order component of the output light from the MZ interferometer becomes minimum or the second-order component becomes maximum.

16. The method in accordance with claim 10,
wherein the step of adjusting bias voltage comprises:
a step of applying signals having skew to the two arms;
a step of measuring output signal from the MZ interferometer when the skew is swept;
a step of determining whether the output signal maintains symmetric property; and
a step of determining a phase difference between bias voltages, the phase difference being assessed as 0 when the output signal maintains symmetric property and the phase difference being assessed as not 0 when the output signal does not maintain symmetric property.

17. The method in accordance with claim 10,
wherein the step of adjusting bias voltage comprises:
a step of applying signals having skew to the two arms;
a step of measuring output signal from the MZ interferometer when the skew is swept;
a step of determining whether the output signal maintains symmetric property; and
a step of determining whether a difference between the intensity of a first-order component and the intensity of a minus first-order component in the signals output from the MZ interferometer is within a predetermined range.

18. The method in accordance with claim 10,
wherein the step of adjusting bias voltage comprises:
a step of applying signals having skew to the two arms;
a step of measuring output signal from the MZ interferometer when the skew is swept;
a step of determining whether the output signal maintains symmetric property; and
a step of determining whether a difference between the intensity of a second-order component and the intensity of a minus second-order component in the signals output from the MZ interferometer is within a predetermined range.

* * * * *